Patented June 21, 1949

2,473,972

UNITED STATES PATENT OFFICE 2,473,972

METHOD OF PRESERVING ALKYL METAL COMPOUNDS

George F. Ruddies, Chicago, Ill.

No Drawing. Application March 19, 1942,
Serial No. 435,297

1 Claim. (Cl. 21—60.5)

The present invention relates to methods of producing alkyl metal compounds, particularly lead alkyls, such as tetraethyl lead.

According to usual methods of preparation, the tetraethyl lead during production and purification is in part decomposed and obtained in decreased yield due to oxidation, steam distillation procedures, and so forth and it often contains by-products or impurities reducing its effectiveness as an anti-knock agent in gasoline or other fuel mixtures.

It is among the objects of the present invention to prepare metal alkyls and particularly tetraethyl lead in increased yields in greater state of purity at reduced cost of production.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects it has been found satisfactory to treat an alkali metal-heavy metal alloy with alkyl halide in the presence of a hydrogen halide.

After the reaction has been completed, the metal alkide which is produced may be readily removed by vacuum distillation and it is not necessary to remove it by steam distillation.

Among the preferred procedures are to combine mono-sodium lead alloy with ethyl chloride in the presence of hydrochloric acid. Hydrobromic acid could also be utilized for such atmosphere although it is quite expensive. The atmosphere during the reaction should preferably be hydrogen chloride.

The hydrogen chloride should always be added slowly and it may be added after the introduction of the ethyl chloride to the lead alloy, or proportioned together with the ethyl chloride, if desired.

Although various proportions may be utilized, it has been found satisfactory according to one embodiment to utilize about 300 parts by weight of the alloy for every 200 to 300 parts by weight of ethyl chloride and sufficient hydrogen chloride to form the atmosphere and to acidify the ethyl chloride during the reaction. The hydrogen chloride should be added with constant agitation and cooling.

After this reaction by vacuum distillation, it is possible to recover between 300 to 500 parts of the lead tetraethyl.

As a second procedure which is also preferred, lead chloride may be reacted with magnesium ethyl bromide and thereafter the reaction mixture may be treated with bromine or hydrogen halide, or both, followed by vacuum distillation. The bromine or hydrogen halide is added very slowly after the first reaction appears to have completed itself which takes about 5 to 30 minutes. Upon addition of the bromine and/or hydrogen halide, the reaction is renewed most vigorously and proceeds to final completion.

In this last-mentioned reaction about 500 to 600 parts of the magnesium compound may be utilized for about 300 parts of the lead chloride to produce about 300 to 350 parts of the lead tetraethyl. The bromine or equivalent hydro-halogens may be added in quantities according to various requirements.

In either case the temperature may be maintained between 0 and 12° C. at the start. If necessary, additional cooling means may be provided for the reaction or may be controlled by means of the application of brine or Dry Ice. Even at temperatures as low as —70° C. in the second procedure a satisfactory reaction is obtained upon such cooling.

By means of this production of the lead ethide, other heavy metal alkyls or tetraethyl lead in the presence of a hydrogen chloride atmosphere, a fast reaction and a very high yield is obtained of a most pure tetra-alkyl ethide which may be readily incorporated in gasoline or preserved according to methods hereafter described, for future requirements.

The vessel in which the lead tetraethyl is produced is generally subjected to a vacuum to remove all the air and then the molten sodium lead alloy is introduced in a cooled granular condition, preferably downwards pouring from the melting vessel at a certain angle through a jacketed metal tube to cool, divide and remove the heat of the alloy material; ethyl chloride is added thereto and slowly hydrogen chloride forming the atmosphere to complete the reaction efficiently.

The material is free of impurities and by-products which decreases its effectiveness and the vacuum distillation results in the production of a most satisfactory tetra-alkyl lead compound.

The reaction may be carried on under vacuum or under atmospheric pressure or under pressures varying from 15 inches vacuum to 15 to 30 lbs. above atmospheric.

The vacuum distillation may be carried out at various pressures varying from zero to ¾ atmospheric and preferably as near zero as possible.

The tetraethyl lead which is produced may be most readily preserved by the addition thereto of an alkyllated aromatic amine, the preferred aromatic amine being aniline.

Although methyl-ethyl, butyl and other alkylated anilines may be employed, it has been found satisfactory to use the benzylated compound, and among the preferred compounds are monobenzyl-para-aminophenol. This compound may be most conveniently added in small amounts to the tetra-ethyl lead after vacuum distillation, and it is preferably added in amounts varying from 0.1% to 1.0%.

It has been found most desirable to dissolve this compound in an aliphatic amine before addition, the preferred amines being the alkanol amines, such as ethanolamine and particularly triethanolamine or diamino-propanol.

The solution of monobenzyl-para-aminophenol in triethanolamine forms a surface film on the top of the tetraethyl lead which is very thin and yet gives full protection to the tetraethyl lead. This composition appears to stabilize the tetraethyl lead most effectively and to prevent decomposition or deterioration thereof, also to decrease the ionization potentials.

At the same time the tetraethyl lead may be removed from below the surface layer when added to gasoline so that none of the protective or stabilizing material will be carried into the gasoline or other fuel which is to be stabilized.

Other amino or hydroxy aromatic compounds may be utilized in lieu of monobenzyl-para-amino-phenol and generally the preferred compounds are anti-oxidants or insoluble inert materials. If these materials are not liquid, the solvent for these materials may take the form of other organic aliphatic hydroxy, polyhydroxy or amino-hydroxy, polyamino materials which are not soluble in the lead tetraethyl and which will form a definite thin layer upon the surface of the lead tetraethyl when spread thereon without reaction with the lead tetraethyl. These solvents may also be used by themselves to form surface films to protect the tetraethyl lead. According to such factors as is intended for the duration of storage of the tetraethyl lead, condition of same or expense to be considered, such readily available and wide varying compounds as aniline polyhydric alcohols such as, ethylene glycol and glycerol or lecithin may be employed very satisfactorily for preservation against oxidation from within or without the tetraethyl lead. Generally ethers and hydrocarbons should not be utilized as the solvent for the para-amino or para-hydroxy compounds or by themselves to form a protective surface layer on the lead tetraethyl.

Lead tetraethyl stabilized in this way is particularly effective, since it appears to give an octane rating as high as 19 without any particular purification operation.

The material which is produced is produced in high yield without loss of oxidation and steam distillation.

Moreover it is not necessary to add a considerable percentage of various addition agents to such leaded gasoline as ethylene dibromide and so forth, which increase the expense and decrease the anti-knock value of tetraethyl lead if spark plugs are provided with metallic deposit displacing means from the insulators which is subject to a separate patent application Serial No. 347,144, filed July 24, 1940, now Patent No. 2,327,220 granted August 17, 1943.

The present application is a continuation in part of application Serial No. 232,804, filed October 1, 1938, which has matured into Patent No. 2,277,781, granted March 31, 1942.

The invention is not intended to be restricted to any particular composition or any particular porportions, nor to any particular ingredients nor to any specific methods of compounding or combining the same, nor to any of the various details thereof herein described, as the same may be modified in various particulars or be applied in many varied relationships without departing from the spirit and scope of the claimed invention, and the practical embodiments herein illustrated and described merely show some of the various features entering into the application of the invention.

What is claimed is:

A process of stabilizing tetra-alkyl lead which comprises placing upon the surface thereof a thin relatively inert protective surface film consisting of mono-benzyl-para-aminophenol dissolved in tri-ethanolamine.

GEORGE F. RUDDIES.

REFERENCES CITED

The following references are of record in the file of this patent:

UNITED STATES PATENTS

| Number | Name | Date |
|---|---|---|
| 1,074,747 | Rowe | Oct. 7, 1913 |
| 1,333,029 | McIntyre | Mar. 9, 1920 |
| 1,415,351 | Howard et al. | May 9, 1922 |
| 1,835,140 | Calcott | Dec. 8, 1931 |
| 1,843,942 | Calcott | Feb. 9, 1932 |
| 2,155,678 | Ooesbrhout | Apr. 25, 1939 |
| 2,248,658 | Bogdan et al. | July 8, 1941 |